United States Patent [19]
Windler

[11] 3,968,409
[45] July 6, 1976

[54] GROUND FAULT DETECTOR CIRCUIT WITH HIGH CURRENT INHIBIT

[75] Inventor: Harold W. Windler, Hales Corners, Wis.

[73] Assignee: Allen-Bradley Company, Milwaukee, Wis.

[22] Filed: Feb. 10, 1975

[21] Appl. No.: 548,295

[52] U.S. Cl.................... 317/32; 317/13 A; 317/35; 317/36 TD; 307/235 N
[51] Int. Cl.² ...................................... H02H 7/085
[58] Field of Search .......... 317/13 R, 13 A, 13 B, 317/32, 35, 36 TD, 40 R, 40 A, 141 S; 307/235 N, 235 R

[56] References Cited
UNITED STATES PATENTS

| | | | |
|---|---|---|---|
| 1,684,249 | 9/1928 | Stevenson, Jr. | 317/35 X |
| 1,919,895 | 7/1933 | Luthi | 317/35 |
| 3,155,879 | 11/1964 | Casey et al. | 317/32 |
| 3,558,978 | 1/1971 | Nye et al. | 317/13 R |
| 3,579,038 | 5/1971 | Backderf et al. | 317/40 A X |

Primary Examiner—J D Miller
Assistant Examiner—Patrick R. Salce
Attorney, Agent, or Firm—Quarles & Brady

[57] ABSTRACT

A current transformer couples to the power lines leading to a motor starter and it generates a current proportional to the current which flows as a result of ground faults. When the ground fault current reaches a first level, the circuit is tripped and a circuit breaker deenergizes the motor starter. When the ground fault current reaches a second, much higher, level the circuit is inhibited from operating to allow circuit interrupting devices in the motor starter to interrupt the circuit to the motor.

7 Claims, 1 Drawing Figure

U.S. Patent   July 6, 1976   3,968,409
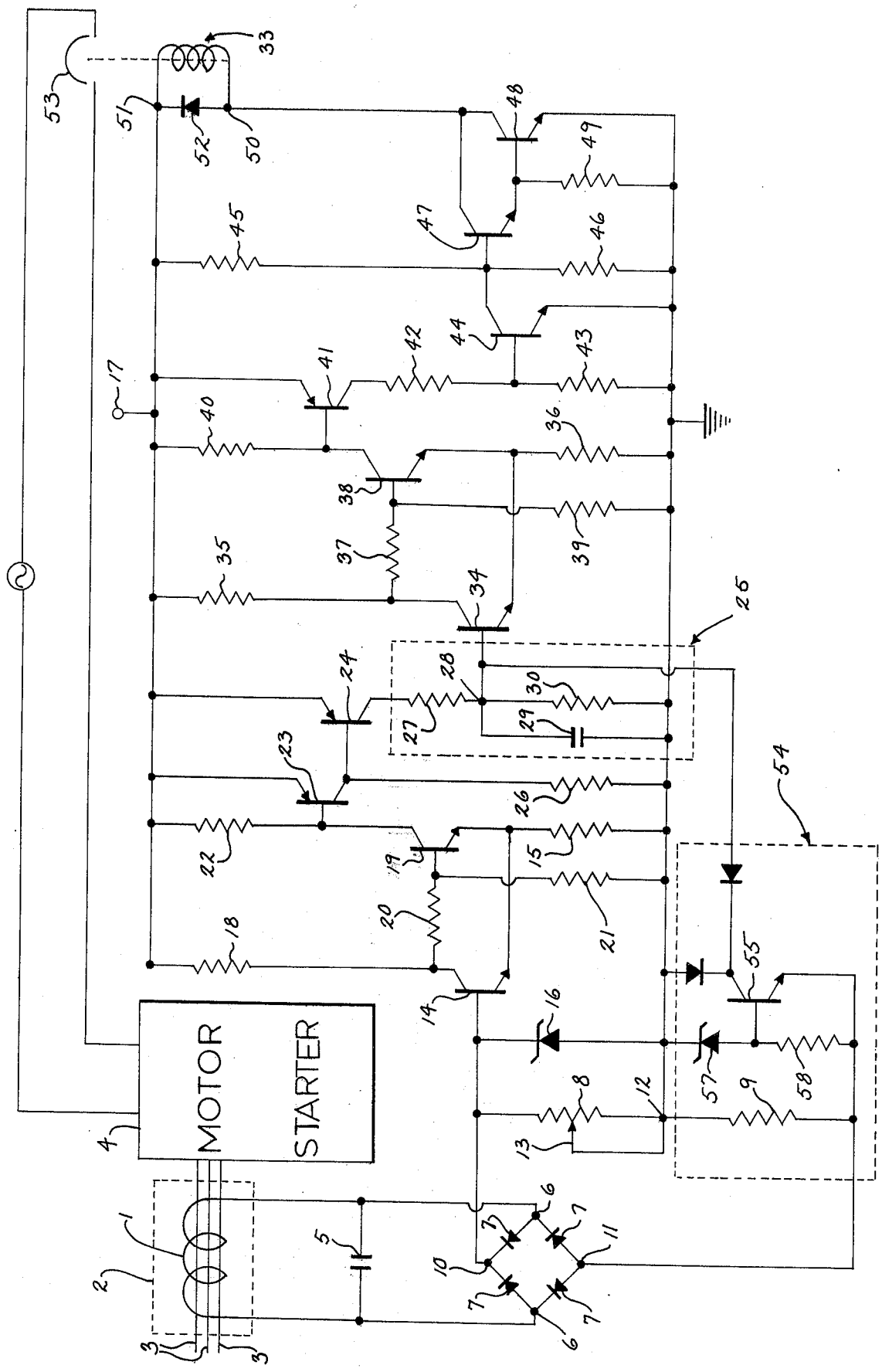

GROUND FAULT DETECTOR CIRCUIT WITH HIGH CURRENT INHIBIT

BACKGROUND OF THE INVENTION

The field of the invention is sensors for protecting alternating current electrical equipment against damage from ground faults.

Numerous ground fault sensors are known in the art and include a current transformer that couples to the power lines leading to the electrical equipment to be protected. If arcing to ground, or a short circuit to ground should occur in one or more of the power lines, the current flowing to the electrical equipment will differ from that leaving the electrical equipment and a net current flow in one direction will be established. This ground fault current induces a voltage in the transformer secondary winding and circuitry is connected thereto which shuts down the electrical equipment when the fault current reaches a preset level. When applied to motor starters, for example, the circuit is connected to deenergize the line contactor when the ground fault current reaches a preset magnitude.

Due to the limitations in the current interrupting capacity of the line contactor in a motor starter, it is more desirable to allow the fusing elements in the motor starter to interrupt very high ground fault currents. To accomplish this, in prior circuits a substantial time delay is built into the ground fault detection circuitry to allow time for the fusing element to operate when the ground fault current is of such magnitude. This time delay in the response of the ground fault detection circuit is undesirable in cases where the ground faults are less catastrophic.

SUMMARY OF THE INVENTION

The present invention relates to a ground fault detector circuit for a motor starter in which its operation is inhibited when excessively high ground fault currents are detected. More specifically, it includes a current transformer coupled to the power lines leading to the motor starter and operable to generate a current in its secondary winding which is proportional to the ground fault current in the power lines, a trip current level detector coupled to the secondary winding and operable to generate an output voltage when the ground fault current reaches a first preselected level, a time delay circuit connected to the trip current level detector to receive the output voltage and to impart a time delay thereto, an output circuit connected to the time delay circuit to receive the delayed output voltage, the output circuit being coupled to the motor starter disconnect switch to deenergize the motor starter when the delayed output voltage is received, and a high current level detector connected to the secondary winding and operable to generate a disabling voltage to the time delay circuit which inhibits its operation when the ground fault current reaches a second preset level which is substantially higher than the first preset level.

A general object of the invention is to inhibit the operation of the fault detector circuit when the ground fault current reaches a level which should not be interrupted by the motor starter disconnect switch. The present invention includes a high current level detector which senses the damaging current level and disables a time delay circuit before the delayed voltage is generated to the output circuit. As a result, the motor starter remains operative until the fuses operate.

Another object of the invention is to improve the response time of the ground fault detection circuit. Rather than imposing a substantial time delay on the operation of the fault detection circuitry, a minimal time delay is required to allow the high current level detector to sense the excessive current levels and disable the circuitry. In most instances, therefore, the ground fault detection circuitry will deenergize the disconnect switch on the motor starter within a few cycles of the power line frequency after the ground fault current reaches the first preset level.

The foregoing and other objects and advantages of the invention will appear from the following description. In the description reference is made to the accompanying drawing which forms a part hereof, and in which there is shown by way of illustration a preferred embodiment of the invention. Such embodiment does not necessarily represent the full scope of the invention, however, and reference is therefore made to the claims herein for interpreting the scope of the invention.

DESCRIPTION OF THE DRAWING

The FIGURE 1 is an electrical schematic diagram of the ground fault detection circuit of the present invention.

DESCRIPTION OF THE PREFERRED EMBODIMENT

The secondary winding 1 of a current transformer 2 is wound around three power lines 3 which deliver three-phase power to a motor starter 4. The secondary winding 1 has five thousand turns which encircle the power lines 3 and are magnetically coupled thereto to generate a voltage which is proportional to the net current flow in the power lines 3. A capacitor 5 is connected across the terminals of the winding 1 and its value is selected to tune the tank circuit formed by the winding 1 and capacitor 5 to the power line frequency. The winding terminals also connect to the inputs 6 of a full wave bridge rectifier circuit formed by a set of four diodes 7. The a-c voltage generated by the current transformer is thus converted to a pulsating d-c voltage which appears across a set of output terminals 10 and 11 on the rectifier circuit.

A voltage divider formed by a trip level potentiometer 8 an an inhibit level resistor 9 is connected across the output terminals 10 and 11 of the rectifier circuit. The junction 12 of the potentiometer 8 and resistor 9 forms circuit ground and the wiper 13 on the potentiometer 8 connects thereto. The base of an input transistor 14 connects to the positive output terminal 10 of the rectifier circuit and its emitter connects to circuit ground through a feedback resistor 15. A zener diode 16 connects between the base of the transistor 14 and circuit ground to protect the transistor base-emitter junction from excessive voltages. The collector of the transistor 14 connects to a positive d-c supply terminal 17 through a load resistor 18.

The input transistor 14 operates in combination with a second transistor 19 as a Schmitt trigger. The base of the second transistor 19 connects to the collector of input transistor 14 through a coupling resistor 20 and to signal ground through a bias resistor 21. Its emitter connects to signal ground through the feedback resistor 15 and its collector connects to the positive supply terminal 17 through a load resistor 22.

As is well known in the art, when the voltage at the base of input transistor 14 reaches a selected level, the transistor 14 turns on and second transistor 19 turns off. The voltage at the collector of transistor 19 thus rises, or steps, to a higher voltage level. The Schmitt trigger does not revert to its untripped state until the voltage at the base of transistor 14 drops substantially below that necessary to trip it. This "hysteresis" in the operation of the circuit insures that the collector of second transistor 19 remains at its higher voltage state for a time period sufficient to operate the subsequent circuitry even though the level of the applied voltage drops below the trip point.

The output of the Schmitt trigger is amplified by a pair of cascade connected PNP transistors 23 and 24 and applied to a time delay circuit 25. More specifically, the collector of second transistor 19 connects to the base of the first PNP transistor 23, the emitter of which is connected to the positive supply terminal 17, and the collector of which is connected through a load resistor 26 to circuit ground. The collector of the first PNP transistor 23 in turn connects to the base of the second PNP transistor 24, the emitter of which is also connected to the positive d-c terminal 17. The collector of PNP transistor 24 connects to a timing resistor 27 in the time delay circuit 25 which in turn connects to a node 28. The time delay circuit 25 also includes a capacitor 29 which connects between the node 28 and circuit ground and a resistor 30 which connects between the node 28 and circuit ground.

When the Schmitt trigger is tripped, the first PNP transistor 23 is turned off and the second PNP transistor 24 is turned on. As a result, its collector voltage rises sharply and charging current flows to the capacitor 29 through the timing resistor 27. The voltage at the node 28 rises exponentially as the capacitor 29 is charged and the values of timing resistor 27 and capacitor 29 are chosen such that the rise time is approximately 20 milliseconds. When the Schmitt trigger reverts to its untripped state, the second PNP transistor 24 turns off and the capacitor 29 discharges through the resistor 30.

The output of the time delay circuit 25 connects through a second Schmitt trigger circuit to a series of output transistors which provide current gain sufficient to drive a circuit breaker winding 33. More specifically, the node 28 in the time delay circuit 25 connects to the base of an input transistor 34 which has its collector connected to the positive supply terminal 17 through a load resistor 35 and its emitter connected to signal ground through a feedback resistor 36. The collector of input transistor 34 also connects through a coupling resistor 37 to the base of a second transistor 38. The base of the transistor 38 connects to signal ground through a bias resistor 39. Its collector connects to the positive supply terminal 17 through a load resistor 40, and its emitter connects to signal ground through the feedback resistor 36. The collector on the second transistor 38 also connects to the base of a first amplifier transistor 41 which has its emitter connected to the positive supply terminal 17 and its collector connected to signal ground through series connected coupling resistor 42 and bias resistor 43. The base of a second amplifier transistor 44 connects to the junction of the resistors 42 and 43, its emitter connects to circuit ground, and its collector connects to the positive supply terminal 17 through a load resistor 45 and to circuit ground through a bias resistor 46.

The collector on the second amplifier transistor 44 also connects to the base of a first output transistor 47 which is connected in a Darlington configuration with a second output transistor 48. More specifically, the emitter of output transistor 47 is connected to the base of output transistor 48 and is connected to signal ground through a bias resistor 49. The emitter on output transistor 48 is connected to signal ground and the collectors on both output transistors 47 and 48 are commonly connected to one terminal 50 on the circuit breaker winding 33. A second terminal 51 on the winding 33 connects to the positive supply terminal 17 and a diode 52 connects across the terminals 50 and 51 to divert any current surges generated by the winding 33 away from the output transistors 47 and 48.

When a ground fault occurs, the transformer 2 generates a current which in turn causes a voltage drop to occur across the trip level potentiometer 8. The first Schmitt trigger formed by the transistors 14 and 19 is tripped when this current reaches a first preselected level and the second Schmitt trigger formed by the transistors 34 and 38 is tripped approximately 20 milliseconds later by the delayed output voltage of the time delay circuit 25. More specifically, when the voltage at the node 28 in the time delay circuit 25 rises to the point at which the base emitter junction in the input transistor 34 becomes conductive, the transistor 34 is turned on and its associated transistor 38 is turned off. As a result, the voltage at the collector of second transistor 38 rises and turns off the first PNP amplifier transistor 41, which in turn turns off the second amplifier transistor 44. Base current then flows to the output transistor 47 through the resistor 45 to turn both it and the second output transistor 48 on. Current thus flows from the positive d-c supply terminal 17, through the circuit breaker winding 33 and output transistor 48 to circuit ground. When thus energized, the circuit breaker winding 33 opens a contact 53 that connects to deenergize the motor starter 4. If the motor starter 4 includes a line contactor such as that disclosed in U.S. patent application Ser. No. 487,795, for example, the contact 53 is connected in series with the electromagnet winding therein to deenergize it when the fault detection circuit is tripped. As a result, the line contactor of the motor starter 4 will drop out and disconnect the motor. Although there are inherent time delays associated with the operation of the circuit breaker and the line contactor, the ground fault detection circuit trips in approximately 30 milliseconds after the ground fault current exceeds the first preselected level. If the power lines 3 carry 60-cycle current, the ground fault detection circuit trips in less than two cycles.

In the event a ground fault should occur which results in very high ground fault currents in the power lines 3, the ground fault detection circuit is inhibited to allow fusing devices in the motor starter 4 to blow. For example, with low voltage motor starters the ground fault detection circuit is set to trip when ground fault currents in the range of 1 to 6 amperes occur, the exact trip level being determined by the setting of the potentiometer 8. When applied to high voltage motor starters a different valued potentiometer 8 is used and the ground fault detection circuit trips when the ground fault current is in the range of 2 to 12 amperes. The current levels at which the ground fault detection circuit is inhibited by the circuitry now to be described ranges from 122 amperes to 2,980 amperes for low voltage motor starters and up to 6,000 amperes for high voltage starters. In other words, the inhibiting current level is at least ten times greater than the trip current level.

Referring to the drawing, a high current level detector circuit 54 senses the magnitude of the ground fault current and inhibits the operation of the ground fault detection circuit when the current reaches the preselected inhibit level. This circuit includes a switching transistor 55 which has its collector connected to signal ground through a clamping diode 56 and its emitter connected to the negative output terminal 11 of the full-wave bridge rectifier circuit. The base of the transistor 55 connects to signal ground through a zener diode 57 and it connects to the negative output terminal 11 through a bias resistor 58. A coupling diode 59 connects the collector of the transistor 55 to the node 28 on the time delay circuit 25.

The current transformer 2 is designed to provide an output voltage that is proportional to the ground fault current flowing in the power lines 3. The transformer 2 is designed to operate at the trip current level and at the inhibit current level, or in other words, does not saturate at the high current levels at which the level detector circuit 54 is set. The output of the current transformer 2 is rectified by the bridge circuit and a proportional voltage appears at the rectifier output terminals 10 and 11 and is applied across the trip level potentiometer 8 and inhibit level resistor 9. The value of the potentiometer 8 is selected to set the trip level at the desired current range and the value of the inhibit level resistor 9 is selected to set the inhibit current level. When the inhibit current level is reached, the voltage generated across the resistor 9 forward biases the base-emitter junction in the switching transistor 55 to turn it on. The collector of the transistor 55 is driven to a voltage level below that of signal ground and the coupling diode 59 becomes forward biased to conduct current from the node 28 on the time delay circuit 25. The clamping diode 56 prevents the collector from going more than one diode drop below signal ground with the result that the high current level detector circuit 54 clamps the node 28 at circuit ground when the ground fault current exceeds the selected inhibit level. The response time of the high current level detector circuit 54 is much faster than that of the time delay circuit 25, and the ground fault detector output circuitry is thus inhibited before it can deenergize the motor starter 4.

It should be apparent to those skilled in the art that numerous variations can be made in the preferred embodiment described herein without departing from the spirit of the invention. For example, the high current level detector circuit 54 may be coupled to other points in the ground fault detection circuit to inhibit its operation. In such case, however, additional amplification of the inhibiting voltage generated by the switching transistor 55 may be required. Also, other means for deenergizing the motor starter can be used although the circuit breaker is preferable because it latches in its tripped state and remains so until it is manually reset.

I claim:

1. A ground fault detection circuit for a motor starter, the combination comprising:
    a current transformer coupled to the power lines leading to the motor starter and operable to generate a current in its secondary winding which is proportional to the ground fault current in the power lines;
    a trip current level detector circuit coupled to the secondary winding and operable to generate a selected output voltage when the ground fault current reaches a first preselected level;
    a time delay circuit coupled to the trip current level detector to receive the selected output voltage and operable to impart a time delay thereto;
    an output circuit coupled to the time delay circuit to receive the delayed output voltage, said output circuit being coupled to the motor starter to deenergize the same when the delayed output voltage is received; and
    a high current level detector circuit coupled to the secondary winding and operable to generate a disabling voltage which inhibits the application of said delayed output voltage to said output circuit when the ground fault current reaches a second preset level which is substantially higher than the first preset level.

2. The ground fault detection circuit as recited in claim 1 in which the disabling voltage is applied to said time delay circuit to inhibit generation of said delayed output voltage.

3. The ground fault detection circuit as recited in claim 1 in which the output circuit is coupled to the motor starter through a circuit breaker and the current transformer secondary winding is coupled to the trip current level detector circuit and high current level detector circuit through a rectifier circuit.

4. The ground fault detection circuit as recited in claim 3 in which a pair of series connected resistors are connected across the output terminals of the rectifier circuit, said trip current level detector circuit is connected across one of said resistors, and the high current level detector circuit is connected across the other of said resistors.

5. The ground fault detection circuit as recited in claim 1 in which the second preselected current level is at least ten times greater than said first preselected current level and said current transformer is operable to generate said currents in its secondary winding proportional to the ground fault current at both preselected levels.

6. A ground fault detection circuit for a motor starter, the combination comprising:
    a current transformer coupled to the power lines leading to the motor starter and operable to generate a current in its secondary winding which is proportional to the ground fault current in the power lines;
    a rectifier circuit having inputs connected to said current transformer secondary winding and having a pair of output terminals across which a voltage proportional to ground fault current is generated;
    a pair of resistors connected across said rectifier circuit output terminals;
    a trip current level detector circuit having an input connected to one of said resistors and being operable to generate a selected output voltage when the voltage generated by said rectifier circuit reaches a first preselected level;
    a time delay circuit having an input connected to the trip current level detector to receive the selected output voltage therefrom and having a charging capacitor which accumulates a charge when said selected output voltage is generated and generates a voltage proportional to said accumulated charge;

an output circuit having an input terminal connected to said charging capacitor and having an output coupled to the motor starter, said output circuit being operable to deenergize the motor starter when the voltage across said charging capacitor reaches a preselected trip level; and a high current level detector circuit having an input connected to the other of said resistors and an output terminal connected to said charging capacitor, said high current level detector circuit being responsive to the voltage generated by said rectifier circuit to provide a discharge path for said charging capacitor which inhibits it from reaching said preselected trip level when the voltage generated by said rectifier circuit reaches a second preset level which is substantially higher than said first preset level.

7. The ground fault detector circuit as recited in claim 6 in which said trip current level detector circuit is a Schmitt trigger and said output circuit includes a circuit breaker.

* * * * *